Patented June 10, 1952

2,600,245

UNITED STATES PATENT OFFICE 2,600,245

HORTICULTURAL COMPOSITIONS

Sever L. Hopperstead, Brighton, Mich., assignor to The B. F. Goodrich Company, New York, N. Y., a corporation of New York No Drawing. Application November 29, 1946, Serial No. 713,114

12 Claims. (Cl. 71—2.5)

This invention relates to horticultural compositions and more specifically to compositions useful in the spraying of fruit trees for the purpose of reducing the set of fruit thereon, and also useful in controlling fungus diseases thereof.

The pollination of blossoms on fruit trees usually results in the formation of from 3 to 5 fruits per fruit spur which, if allowed to remain on the tree for the entire growing season are likely to cause serious damage to the tree branches and limbs by reason of the excess weight of the fruit. Also, if all of the set fruit is allowed to remain on the tree, the fruit will be smaller in size and the crop of the next year will usually be greatly reduced because of the over-bearing of the previous year. But by reducing the number of set fruit not only will the damage be reduced, but also fruit of more uniform size and quality will be produced, thereby increasing the final net return to the grower.

The present practice in orchards is to reduce the number of the set fruit by hand picking which entails considerable expense. There have also been attempts to bring about a reduction of set fruit on the tree by chemical means, but these attempts have been directed toward partial blossom elimination by means of chemical sprays. Spraying at the blossom period of development, however, has several disadvantages, principal among which is the frost hazard. Frost frequently occurs near the time fruit trees are in bloom and destroys the blossoms with a subsequent reduction in crops. Wet or cold weather unfavorable for bee activity may also result in light set of fruit. Moreover, the spray mixtures which have heretofore been used in reducing fruit set are often injurious to foliage and difficult to apply in correct dosages so that in many cases, the accumulative deleterious effect over a period of several seasons makes their use an unsound practice. Furthermore, their effectiveness in blossom reduction and their safety to foliage and spurs is so closely linked with temperature that their safe use at a time of the year when temperature changes are rapid is extremely difficult for even scientifically trained horticulturists and practically impossible for the average grower.

For the above reasons the use of chemical sprays to eliminate some of the blossoms and thereby reduce the set of fruit has not been generally successful and has been practiced only in isolated instances.

Accordingly, the development of a material or composition which could be applied to fruit trees after pollination and after all damage due to frost is past and which would result in a thinning of the set fruit would find considerable favor among orchardists.

The present invention provides such a material. The compositions which I have found to possess these unusual and useful properties are aqueous dispersions containing polymeric organic polysulfides such as polyethylene polysulfide, and also containing a product of the reaction of a zinc salt of a substituted dithiocarbamic acid with an amine of aliphatic nature by which is meant an amine in which the radicals directly attached to the amino nitrogen atoms are free from aromatic unsaturation. Such compositions are exceedingly useful for the thinning of fruit crops, especially when applied to fruit trees in the calyx stage. The use of these compositions will bring about thinning after the danger of frost has past without producing any injury to the fruit or foliage. It is believed that these compositions are able to produce this unusual result because of a hormone action in stimulating the growth of absciss layer tissues of the fruit stem, but it will be understood that the invention is not limited to this theory. By employing these compositions to promote thinning of fruit, the degree of thinning can be varied from a rapid dropping of from about 60 to about 75% of the set fruit in a short time to a slow, steady dropping of the fruit which takes place well beyond the stage of fruit development when drop would normally have ceased. In fact, the drop can be prolonged until the fruit has reached 40 to 60% of average size.

My new compositions are prepared by mixing in any desired manner an aqueous dispersion of a polymeric organic polysulfide, preferably an aqueous latex-like dispersion of a polymeric alkylene polysulfide such as polymeric ethylene polysulfide with an aqueous dispersion of an addition product obtained by the reaction of a zinc salt of a substituted dithiocarbamic acid with an amine of the type described.

The preferred polysulfide dispersions can be prepared advantageously by condensing ethylene dichloride or other alkylene dihalide, or dichloro diethyl ether or the like with sodium polysulfide in the presence of a salt stable emulsifying or dispersing agent such as casein, sodium or calcium lignin sulphonates, alkyl benzene or naphthalene sulphonates preferably those containing more than 20 carbon atoms, hymolal sulfates, sorbitan monolaurate and others. The preferred emulsifying agent is a lignin sulphonate, for extremely latex-like dispersions containing the polymeric organic polysulfide as extremely small particles, of about 1 to 5 microns in size, can be prepared by employing emulsifiers of this class. The polymeric organic polysulfide obtained by such condensation is preferably washed free of by-product sodium chloride by decantation and then re-emulsified merely by adding water, for the emulsifying agent is not removed by the washing process.

The addition products of a zinc salt of a substituted dithiocarbamic acid with an amine which may be employed according to my invention can be prepared by methods well known to the art. In general these complex zinc dithiocarbamate amine reaction products are prepared by first reacting a primary or secondary amine with carbon disulfide in the presence of a water-soluble zinc salt so that the dithiocarbamic acid is formed as the desired zinc salt and then reacting the zinc dithiocarbamate with the desired amine. The reactions are generally carried out in the presence of water as a reaction diluent since the products are insoluble in water and are most easily recovered in this manner. The preparation of these reaction products is more specifically set forth in U. S. Patent 2,321,301.

The zinc dithiocarbamates which may be reacted with amines to produce products useful according to my invention includes the zinc salts of all those substituted dithiocarbamic acids prepared from the reaction of carbon disulfide with primary and secondary amines such as the zinc salts of alkyl substituted dithiocarbamic acids, alicyclic substituted dithiocarbamic acids, aralkyl substituted dithiocarbamic acids and the like. For example, there may be used the zinc salts of such dithiocarbamic acids as dimethyl dithiocarbamic acid, cyclohexyl dithiocarbamic acid, tetrahydrofurfuryl dithiocarbamic acid, benzyl dithiocarbamic acid, diethyl dithiocarbamic acid, dibutyl dithiocarbamic acid, diamyl dithiocarbamic acid, ethylcyclohexyl dithiocarbamic acid, dibenzyl dithiocarbamic acid, ditetrahydrofurfuryl dithiocarbamic acid and pentamethylene dithiocarbamic acid, as well as the zinc dithiocarbamates which may be derived from di-n-propyl amine, methyl ethyl amine, di-isopropyl amine, di-n-butyl amine, N-methyl cyclohexyl amine, N-butyl cyclohexyl amine, N-methyl-o-methyl cyclohexyl amine, N-methyl tetrahydro alpha furfuryl amine, N-butyl tetrahydro alpha furfuryl amine, morpholine, piperazine, piperidine, ethylene diamine, symmetrical diethyl ethylene amine, symmetrical dibutyl trimethylene diamine and the like.

Amines which may be reacted with the above zinc dithiocarbamates to produce the carbamate-amine addition products may be any of the organic amines in which the amino nitrogen atoms are attached only to radicals free from aromatic unsaturation, but aliphatic amines including primary, secondary and tertiary aliphatic mono and polyamines, alicyclic amines and heterocylic amines in which the heterocyclic ring is free from aromatic unsaturation are preferred. For example, such amines may be used as cyclohexylamine, piperidine, morpholine, methylamine, ethylamine, butylamines, amylamines, hexadecylamine, octadecylamine, dimethyl amine, diethyl amine, dibutyl amine, diamyl amine, trimethyl amine, triamyl amine, ethylene diamine, piperazine, hexadecyl propylene diamine, dibutyl ethylene diamine, diethylene triamine, dimethyl ethylene diamine, symmetrical diethyl trimethylene diamine, symmetrical dipropyl ethylene diamine, N-ethyl cyclohexyl amine, furfuryl amine, and such N-substituted furfuryl amines as N-methyl tetrahydro-alpha-furfuryl amine and the like.

The following specific Examples I and II illustrate the effectiveness of the horticultural compositions of this invention when sprayed on fruit trees for thinning of fruit. In each of the tests presented below the spray compositions contained the specified ingredients and sufficient water to make 100 gallons of spray. These tests are the results of actual field trials in apple orchards of considerable size where, by the proper selection of fruit trees, a number of trees having an exceptionally heavy fruit set could be selected for these tests. One or more trees were used for each test, and all numbers of fruit and average numbers of fruit were determined by actual counts for each tree.

EXAMPLE I

In this example an aqueous dispersion of polyethylene polysulfide also containing the addition product of zinc dimethyl dithiocarbamate was sprayed on apple trees (variety Blaxtayman) in the calyx stage of development. The results obtained, together with the results obtained in a control, all on trees of the same varieties are set forth in the following table:

| | Spray Compositions Used Ingredients per 100 gallons | Av. No. Fruit per 100 Spurs Test Tree | Check Test |
|---|---|---|---|
| A | None | 79.6 | 77.6 |
| B | 4 lb. Polyethylene Polysulfide—Aqueous dispersion 50% total solids content.<br>¼ lb. Zinc dimethyldithiocarbamate-cyclohexylamine addition product.<br>1 oz. Grasselli Spreader-Sticker [1] | 51.7 | 47.3 |
| C | 4 lb. Polyethylene Polysulfide—Aqueous dispersion 50% total solids content.<br>¼ lb. Zinc dimethyl dithiocarbamate cyclohexylamine addition product.<br>1 oz. Grasselli Spreader-Sticker [1] | 27.7 | 27.2 |

[1] Grasselli Spreader-Sticker contains sodium oleyl sulfate and a synthetic resinous sticker.

EXAMPLE II

In this example apple trees (Red Delicious variety) growing in the same orchard were sprayed with various compositions of this invention on eight different occasions extending from the calyx stage of development through a period of about six weeks thereafter. The period at which drop of fruit was substantially complete was noted and the average number and size of apples on the various trees was determined at the end of the growing season. The results are set forth in the following table:

| | Spray Composition Used Ingredients per 100 gallons | Spraying at which drop of fruit was substantially complete | Average number and size of apples on treated tree at end of season |
|---|---|---|---|
| A | Control—No treatment | | 932 (small). |
| B | 4 lb. of a polyethylene polysulfide aqueous dispersion of 50% total solids content. 1 oz. Zinc dimethyl dithiocarbamate cyclohexylamine addition product. | 6th | 206 (large). |
| C | Same as B except spray composition contained 2 oz. zinc dimethyl dithiocarbamate cyclohexylamine addition product. | 5th | 246 (large). |
| D | Same as B except spray composition contained 4 oz. zinc dimethyl dithiocarbamate cyclohexylamine addition product. | 4th | 261 (large). |
| E | Same as B except spray composition contained 8 oz. zinc dimethyl dithiocarbamate cyclohexylamine addition product. | 3rd | 240 (large). |
| F | 8 oz. zinc dimethyl dithiocarbamate cyclohexylamine addition product. | 3rd | 856 (small). |
| G | 4 lb. 50% total solids, polyethylene polysulfide dispersion. | 3rd | 679 (medium). |

When the zinc dithiocarbamate-cyclohexylamine reaction product of the spray compositions employed in the above examples is replaced with the product of the reaction of zinc dimethyl dithiocarbamate with ethylene diamine, the resulting spray composition is as effective as the compositions shown in the above examples. Other zinc dithiocarbamate amine reaction products may be combined with polymeric ethylene polysulfide to produce compositions which will have similar hormone activity varying only in degree of effectiveness. The preferred complex reaction products are those prepared from the reaction of zinc dimethyl dithiocarbamates with cyclohexyl amine and ethylene diamine. These amines are preferred because of their present availability and low cost, and because of the stability of the addition products.

The concentration of the polymeric ethylene polysulfides in the spray composition is not critical and may be varied from about ¼% by weight as in the above examples to about 1 to 5% or more as may be desired without any deleterious effects, but, since the addition of substantially more than ¼% of the polymeric polysulfide would make the resulting spray mixtures more expensive, ⅛ to ½% is recommended and preferred.

As will be seen from Example II, the concentration of the addition product effects the rapidity and degree of fruit thinning. At higher concentrations the thinning occurs rapidly whereas at lower concentrations the thinning is not so pronounced and repeated spraying is required. It is thus possible to control the degree and time of thinning, which is quite advantageous, by varying the concentration of the addition product. Compositions having an even higher concentration of addition product than shown in the examples, up to as high as 5% by weight or higher of the total composition for instance, are also useful where a high degree of thinning is desired. Thus, such compositions may be used in insect control to remove substantially all of the crop of diseased fruit and thus protect the tree from further injury or to assist in removing the crop at harvest time.

The addition of the Spreader-Sticker can be omitted entirely if desired as shown in Example II. It was employed in the field test of Example I mainly to insure good spreading when the compositions were sprayed on the fruit trees, and has no effect on the inherent activity of the spray. It also aided in dispersing the carbamate-amine complex.

Neither the zinc dithiocarbamate amine complex nor the polymeric ethylene polysulfide when used alone produced the unusual results of thinning as does the combination of these ingredients, as shown by the results of spray compositions F and G of Example II. Composition F appears to be only slightly better than no treatment at all, while composition G gives only very moderate thinning. With compositions B to E, however, where the combination of these ingredients was used, the thinning of the fruit was very effective.

My compositions have no noticeable toxic effect to the fruit, leaves or flowers as shown by test with several varieties of apples, and in fact proved to be very effective fungicides against such common fungus diseases as apple rust and apple scab. Thus, these compositions will serve more than one purpose when used as a thinning agent.

The following specific Examples III and IV demonstrates the effectiveness of these new horticultural compositions in controlling apple scab. The compositions shown in the following examples were sprayed on apple trees at 8 different times over about a 3 months' period beginning at about the middle of May. The sprays were applied by means of the usual spraying equipment at about 550 pounds pressure using, on the average, 15 gallons of spray per tree. The data represent the average of the results obtained from single trees of plots selected at random and replicated 5 times. The effectiveness of the composition used was determined by selecting twigs of leaves at random and counting the leaves and fungi lesions and comparing the number of infected leaves where treatment was used with the number of infected leaves where no treatment was used. The results of these examples are set forth in tabular form as follows:

EXAMPLE III

Control of apple scab on apple trees of Rome Beauty variety

| | Spray Composition Used | No. Lesions | No. Leaves | Ratio Lesions/Leaf |
|---|---|---|---|---|
| A | None | 400 | 440 | 1:1.1 |
| B | Aqueous dispersion of polymeric ethylene polysulfide containing 2 lbs. polymer per 100 gal. of spray. | 71 | 460 | 1:6.5 |
| C | Aqueous dispersion of zinc dimethyl dithiocarbamate cyclohexylamine complex containing 0.4 lb. of complex per 100 gal. of spray. | 33 | 465 | 1:14 |
| D | Aqueous dispersion containing 2 lbs. polymeric ethylene polysulfide and 0.4 lbs. zinc dimethyl dithiocarbamate-cyclohexylamine complex per 100 gal. of spray. | 16 | 411 | 1:26 |

EXAMPLE IV

*Control of apple scab on apple trees of Red Delicious and MacIntosh varieties*

| | Spray Composition Used | Per cent Infected Leaves | |
|---|---|---|---|
| | | Red Delicious | MacIntosh |
| A | None | 71 | 100 |
| B | Aqueous dispersion of polymeric ethylene polysulfide containing 2.0 lbs. of polymer per 100 gal. of spray. | 0.4 | 7.0 |
| C | Aqueous dispersion of zinc dimethyl dithiocarbamate cyclohexylamine complex containing 0.4 lb. of complex per 100 gal. of spray. | 4.0 | 24.0 |
| D | Aqueous dispersion containing 2.0 lbs. polymeric ethylene polysulfide and 0.4 lb. zinc dimethyldithiocarbamate cyclohexylamine complex per 100 gal. of spray. | 0.2 | 5.0 |

The above data indicate that my compositions containing both the polymeric ethylene polysulfide and the zinc dithiocarbamate-amine complex, in general, are far better compositions as fungicides than those compositions which merely contain either the polymeric ethylene polysulfide or the zinc dithiocarbamate amine complex, and produce results which cannot be attributed merely to the combination of these two components.

My compositions also have some activity as insecticides, but are more useful in combination with other insecticides for they increase the effectiveness of such common insecticides as nicotine sulphate, fixed nicotine, dichloro diphenyl trichlorethane (DDT), arsenicals, rotenone, pyrethrins and others.

In the above Examples III and IV the concentration of the components in the spray compositions of my invention are those which have been given the best results in controlling fungus diseases in field tests under specific conditions. The optimum concentration of other dithiocarbamate amine reaction products, when used with polymeric ethylene polysulfides, will vary from those given above for zinc dimethyldithiocarbamate-cyclohexylamine as will be understood by those versed in the art, for the effectiveness of treatment varies with the molecular weight of the complex as well as the nature of the substituents on the nitrogen atoms of the amines and of the dithiocarbamates.

While I have disclosed specific examples of my invention, I do not thereby desire or intend to limit myself solely thereto, for, as hitherto stated, other equivalent chemical compounds can be employed and the proportions of the active ingredients may be varied, if desired, without departing from the spirit and scope of my invention as defined in the appended claims.

I claim:

1. A method of decreasing the number of fruit sets on a fruit tree which comprises spraying said fruit tree after the fruit has set with an aqueous spray composition comprising dispersed particles of (A) a substance selected from the class consisting of polymeric alkylene and ethyleneoxyethylene polysulfides and (B) a complex carbamate-amine compound identical with that resulting from the chemical addition of a zinc salt of a substituted dithiocarbamic acid with an amine selected from the class consisting of alkyl monoamines, alkylene polyamines, alicyclic amines, and heterocyclic amines, said amines being free from aromatic unsaturation and containing only amino groups as non-hydrocarbon substituent groups.

2. The method of claim 1 wherein (A) is polyethylene polysulfide.

3. The method of claim 1 wherein (B) is the complex chemical compound identical with that resulting from the chemical addition of zinc dimethyl dithiocarbamate with cyclohexyl amine.

4. The method of claim 1 wherein (B) is the complex compound identical with that resulting from the chemical addition of zinc dimethyl dithiocarbamate with ethylene diamine.

5. The method of claim 1 wherein the aqueous spray composition contains, in each 100 gallons of spray, about 2 pounds of (A) and from 1 to 8 ounces of (B).

6. An aqueous composition comprising dispersed particles of (A) a substance selected from the class consisting of polymeric alkylene and ethyleneoxyethylene polysulfides and (B) a complex chemical compound identical with that resulting from the chemical addition of a zinc salt of a substituted dithiocarbamic acid with an amine selected from the class consisting of alkyl monoamines, alkylene polyamines, alicyclic amines and heterocyclic amines said amines being free from aromatic unsaturation and containing only amino groups as non-hydrocarbon substituent groups, said composition being characterized by possessing the ability to form an adherent, resistant and discontinuous coating containing (A) and (B).

7. An aqueous composition comprising dispersed particles of (A) a substance selected from the class consisting of polymeric alkylene and ethyleneoxyethylene polysulfides and (B) a complex chemical compound identical with that resulting from the chemical addition of a zinc salt of a disubstituted dithiocarbamic acid with an amine selected from the class consisting of alkyl monoamines, alkylene polyamines, alicyclic amines and heterocyclic amines said amines being free from aromatic unsaturation and containing only amino groups as non-hydrocarbon groups, said composition being characterized by possessing the ability to form an adherent, resistant and discontinuous coating containing (A) and (B).

8. An aqueous composition comprising dispersed particles of (A) a substance selected from the class consisting of polymeric alkylene and ethyleneoxyethylene polysulfides and (B) a complex compound identical with that resulting from the chemical addition of a zinc salt of a dialkyl dithiocarbamic acid with an amine selected from the class consisting of alkyl monoamines, alkylene polyamines, alicylic amines and heterocyclic amines, said amines being free from aromatic unsaturation and containing only amino groups as non-hydrocarbon substituent groups, said composition being characterized by possessing utility in sprays for treating plant foliage by reason of its pesticidal activity, its activity as a fruit thinner and the ability of such a spray to deposit on plant foliage an adherent, resistant and discontinuous coating containing (A) and (B).

9. An aqueous composition comprising dispersed particles of (A) polymeric ethylene polysulfide and (B) a complex chemical compound identical with that resulting from the chemical addition of zinc dimethyl dithiocarbamate with an amine selected from the class consisting of alkyl monoamines, alkylene polyamines, alicyclic amines and heterocyclic amines said amines being free from aromatic unsaturation and containing only amino groups as non-hydrocarbon substituent groups, said composition being characterized by possessing utility in sprays for treating plant foliage by reason of its pesticidal activity, its activity as a fruit thinner and the ability of such a spray to deposit on plant foliage an adherent, resistant and discontinuous coating containing (A) and (B).

10. The aqueous composition of claim 9 wherein (B) is a complex chemical compound identical with that resulting from the chemical addition of zinc dimethyl dithiocarbamate with cyclohexyl amine.

11. The aqueous composition of claim 9 wherein (B) is a complex chemical compound identical with that resulting from the chemical addition of zinc dimethyl dithiocarbamate with ethylene diamine.

12. A composition comprising particles of (A) a substance selected from the class consisting of polymeric alkylene and ethyleneoxyethylene polysulfides and (B) a complex zinc carbamate-amine chemical addition product identical with that resulting from the chemical addition of a zinc salt of a substituted dithiocarbamic acid with an amine selected from the class consisting of alkyl monoamines, alkylene polyamines, alicyclic amines, and heterocyclic amines, said amines being free from aromatic unsaturation and containing only amino groups as non-hydrocarbon substituent groups.

SEVER L. HOPPERSTEAD.

REFERENCES CITED

The following references are of record in the file of this patent:

UNITED STATES PATENTS

| Number | Name | Date |
| --- | --- | --- |
| 2,364,186 | Bersworth | Dec. 5, 1944 |
| 2,379,464 | Thies | July 3, 1945 |
| 2,465,512 | Carasso | Mar. 29, 1949 |
| 2,465,513 | Carasso | Mar. 29, 1949 |

OTHER REFERENCES

Hackh's Chemical Dictionary, third edition, page 851, definition of "Thiokol;" published 1944.